United States Patent [19]

Berger et al.

[11] 4,061,503

[45] Dec. 6, 1977

[54] SILANE TREATMENT OF TITANIUM DIOXIDE PIGMENT

[75] Inventors: Sidney Ethan Berger, Rye, N.Y.; George Anthony Salensky, Metuchen, N.J.

[73] Assignee: Union Carbide Corporation, New York, N.Y.

[21] Appl. No.: 727,673

[22] Filed: Sept. 29, 1976

[51] Int. Cl.$^2$ .................................................. C09C 1/36
[52] U.S. Cl. .................................. 106/300; 106/308 Q
[58] Field of Search ............... 106/300, 288 Q, 308 Q; 260/448.2 B

[56] References Cited

U.S. PATENT DOCUMENTS

| | | | |
|---|---|---|---|
| 3,227,675 | 1/1966 | Papalos | 106/308 Q |
| 3,350,345 | 10/1967 | Vanderbilt et al. | 106/308 Q |
| 3,839,065 | 10/1974 | Overhults et al. | 106/308 Q |

*Primary Examiner*—Winston A. Douglas
*Assistant Examiner*—J. V. Howard
*Attorney, Agent, or Firm*—Peter R. Shearer

[57] ABSTRACT

This invention is concerned with the treatment of particulate titanium dioxide with a polyether substituted silicon compound which serves to enhance its employment in pigmented and/or filled paints and plastics, and in reinforced plastic composite compositions.

10 Claims, No Drawings

SILANE TREATMENT OF TITANIUM DIOXIDE PIGMENT

This invention relates to organosilicon treated particulate titanium dioxide in which the organo group contains polyether groups. More particular, this invention is concerned with organosilicon treated titanium dioxide particulate materials readily employable in coating compositions, plastic molding compositions and in reinforced plastic composite compositions.

Organosilicon compounds have for some time been employed in the treatment of inorganic oxide surfaces such as inorganic oxide films, particulate fillers and pigments, and fibers (such as glass fibers, aluminum fibers and steel fibers). Aluminum and steel fibers are regarded to be oxide surfaces because they are oxidized even though their sub-surfaces are not. The typical organosilicon treatment involves coating such surfaces with a hydrolyzate (and/or condensate of the hydrolyzate) of an organofunctional hydrolyzable silane. Such organofunctional hydrolyzable silanes are termed "Coupling Agent" and/or "Adhesion Promoter". The organofunctional groups typically contain groups reactive with complimentarily reactive groups in the medium in which the Coupling Agent is provided. The Coupling Agent is typically supplied to the surface of the inorganic oxide whereby through the hydrolyzable groups or silanol groups ($\equiv$Si—OH), bonding through siloxy moieties ($\equiv$Si—O—) is effected. Typical hydrolyzable groups include alkoxy of 1 to about 4 carbon atoms, alkoxyalkoxy containing up to about 6 carbon atoms, halogen such as chlorine, fluorine, and bromine, acyloxy of 2 to about 4 carbon atoms, phenoxy, and oxime. The preferred hydrolyzable groups are alkoxy, alkoxyalkoxy and acyloxy. Common organofunctional groups are bonded to silicon by a carbon to silicon bond. The typical commercial functional radicals present in the organofunctional groups are vinyl, methacryloxy, primary amino beta-aminoethylamino, glycidyl, epoxycyclohexyl, mercapto, polysulfide, ureido, and polyazamide. Another conventional technique for supplying the Coupling Agent to the inorganic oxide surface is by the integral blending technique. This technique involves adding to the resin medium the desired amount of the Coupling Agent and providing the medium in contact with the inorganic oxide surface by supplying the latter as a particulate filler or fiber to the medium or supplying the medium with the Coupling Agent to a continuous surface in the form of a film, fabric, foil or other shapes, wherein the Coupling Agent migrates within the medium to contact the surface or surfaces, react thereat and couple with the medium under the molding, curing and other shaping conditions.

As a rule, Coupling Agents enhance the chemical bonding between the medium and the inorganic oxide substrate thereby to achieve improved adhesion between them. This could affect the strength properties of the composite of the plastic or resin associated with the inorganic oxide substrate or substrates.

Apart from use of organofunctional silanes as Coupling Agents, they have been used, in selected cases, as fiber and fabric sizing agents and as pigment modifiers to alter dispersion characteristics in a given medium. Illustrative of these utilities, polyazamide silanes as disclosed in U.S. Pat. No. 3,746,748, patented July 17, 1973, are effective sizes for glass fiber woven fabrics, and methylsilanes have been employed to modify the dispersion characteristics of silica aerogels in silicone rubbers minimizing creep hardening of the silicone gum undergoing cure. The methyl groups in this case may be functional because the cure mechanism may attack them.

Silane Coupling Agents have been extensively employed in the surface treatment of inorganic particulate materials such as fillers, pigments, and materials which also act to reinforce the resin or plastic material in which it is incorporated such as asbestos fibers and relatively short length glass fibers, such as staple glass fibers. All of these have been beneficially treated by certain organofunctional silane Coupling Agents. However, in only rare instances do these Coupling Agents provide benefits other than increased adhesion. One particular exception is the use of vinyl silanes on aluminum trihydrate to enhance, to a limited degree, their dispersion in polyester resin systems. It is traditionally accepted that organosilanes add essentially no benefits to and generally detract from the properties of carbon black when employed in paints, dyes, rubber, plastics, etc., even though carbon black contains chemisorbed oxygen.

There is described herein the use of an organosilane which is relatively non-reactive in its organo moiety and has the capability of reacting with titanium dioxide surfaces to which it is supplied. This silane, by virtue of the relative inactivity of its organic moiety, should not be classically termed a Coupling Agent, yet its utilization on titanium dioxide results, in many cases, in improved strength properties for the composite in which it is incorporated. However, the main feature of this organosilane is the fact that it provides to the titanium dioxide, to which it is supplied, superior properties in the area of handling when utilized in the manufacture of coating and composite systems. This organosilane contains polyether moieties which are essentially non-reactive in terms of their ability to covalently bond to functional or nonfunctional plastic or resinous materials, yet it does possess the capability of associatively bonding, as well as provide a measure of compatibility, with the resin or plastic system in which the particulate inorganic oxide containing it is to be supplied. The organosilanes of this invention are characterized as structures having the following general formula:

$$R^{II}(OR^{I})_{a}ORSiX_{3} \qquad (I)$$

R in Formula (I) can be any divalent organic group which is either oxygen or carbon bonded to the silicon atom.

R may be any divalent radical which effectively joins the remainder of the molecule to the silicon atom. In essence, R is an inert moiety to the invention because the invention serves the function which contemplates two components joined together into one molecule. The first component is a hydrolyzable group characterized by the moiety — SiX$_3$ and the second component is the group characterized by the moiety $(OR^{I})_{a}$. Though typically the relationship of the two molecules to each other in the classical sense of Coupling Agents, assuming the $(OR^{I})_{a}$ moiety was termed organofunctional, would be dependent upon the size and chemical characterization of "R", that relationship is not apparent in the case of the instant invention. Thus given a particular "R", there exists an $(OR^{I})_{a}$ and $a \equiv $ SiX$_3$ combination which provides the advantages of this invention.

Usually, when R is an extremely large or bulky moiety, its impact upon the utility of the organosilane of formula (I) can be mitigated by increasing the size of $a$ and/or using a solvent, such as ethanol, when the silane is supplied to the alumina trihydrate.

Though other desirable R's will be illustrated hereinafter, the preferred R is an alkylene group containing from 1 to about 8 carbon atoms, preferably 2 to about 6 carbon atoms. $R^I$ is one or more 1,2-alkylene groups each containing at least 2 carbon atoms and typically not more than about 4 carbon atoms, preferably $R^{II}$ is ethylene. $R^{II}$ is hydrogen, an alkyl group containing 1 to about 8 carbon atoms, preferably 1 to about 4 carbon atoms, acyloxy (of 2 to about 4 carbon atoms) or an organofunctional group as defined below for $R^3$, X is a hydrolyzable group such as alkoxy containing, for example, 1 to about 4 carbon atoms, alkoxyalkoxy in which the terminal alkyl contains 1 to about 4 carbon atoms and the internal alkyl is alkylene which contains 2 to about 4 carbon atoms and is preferably ethylene; acyloxy such as acetoxy, propionoxy and the like; aryloxy such as phenoxy, para-methylphenoxy; oximes; calcium oxide, sodium oxide or potassium oxide; and the like. In formula (I), $a$ is a number having an average value of 4 to about 150, preferably about 4 to about 120.

The silane of formula (I) as a preferred embodiment is described in U.S. Pat. No. 2,846,458, patented Aug. 5, 1958. A particular illustration of that silane is set forth at Column 3, line 20, et sequence, of the aforestated patent. However, this invention is not to be construed as limited to the particular silanes which are described in the patent. For example, the patent is exceedingly restrictive in terms of the description of the divalent organic group which joins the polyether to the silicon atom. In accordance with this invention, that divalent organic group encompasses a much greater class of moieties.

Illustrative of the expanse of moieties encompassed by R above, are the following:

—CH$_2$CH$_2$CH$_2$— ;

—CH$_2$CH$_2$— ;

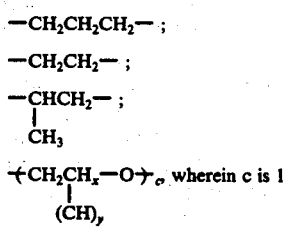

$\{CH_2CH_x-O\}_c$ wherein c is 1
        |
       (CH)$_y$ to about 20, x is 1 when y is 1 and 2 when y is 0, and y is 0 or 1;

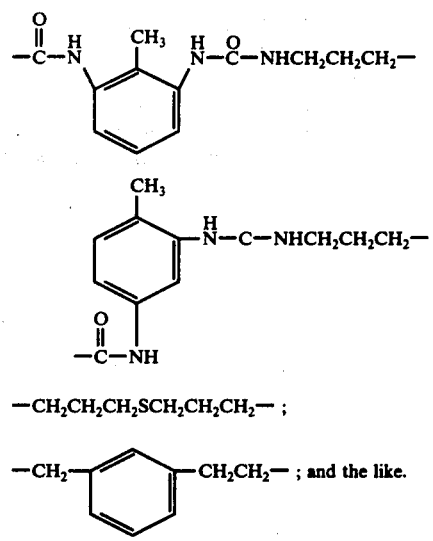

—CH$_2$CH$_2$CH$_2$SCH$_2$CH$_2$CH$_2$— ;

 ; and the like.

As can be seen from the above, the characterization of R is exceedingly diverse and its ultimate limits have not been ascertained except insofar as all experimental evidence has indicated that it constitutes a basically inert component as compared to the function of the hydrolyzable silicon moiety and the separate polyether moiety as characterized above.

Illustrative of the $(OR^I)_a$ moiety of the silanes of formula (I) is the following:

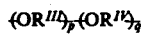

in which $R^{III}$ and $R^{IV}$ are different 1,2-alkylene radicals, in which $R^{III}$ is ethylene and $R^{IV}$ is 1,2-propylene or 1,2-butylene, p is a number greater than q and the sum of p and q is equal to the value of $a$.

The silanes of formula (I) may be used alone or in combination with another and different silane, such as one encompassed by formula:

$$R_n{}^3(SiX_{4-n})_b \qquad (II)$$

or the cohydrolyzate or the cocondensate of such silane with that of formula (I) above. In formula (II), n is equal to 0 to 1 and $R^3$ is an organic radical whose free valence is equal to the value of b and can be alkyl group of 1 to about 18 carbon atoms, preferably about 3 to about 14 carbon atoms, or an organofunctional group bonded to silicon by a carbon to silicon bond. The organofunctional group thereof may be one or more of the following illustrative groups; vinyl, methacryloxymethyl, gamma-methacryloxypropyl, aminomethyl, beta-aminopropyl, gamma-aminopropyl, delta-aminobutyl, beta-mercaptoethyl, gamma-mercaptopropyl, gamma-glycidoxypropyl, beta-(3,4-epoxycyclohexyl)ethyl, gamma-chloroisobutyl, polyazamides such as described in U.S. Pat. No. 3,746,348, gamma-(beta-aminoethyl)-aminopropyl, (ethylene beta-aminoethyl) methacryl ammonium hydrohalide, beta-(4-vinylbenzyl) (ethylene-beta-aminoethyl) ammonium hydrohalide, and the like. Any organo functional hydrolyzable silane suitable for use as a Coupling Agent may be employed in combination with the silane of formula (I).

When there is employed a combination of or co-reaction products of the silanes of formulas (I) and (II), the amount of silane of formula (I) employed should be that amount which provides a viscosity reduction and other advantages as hereindefined. Any amount of the silane formula (II) may be employed so long as such does not hinder the role of the silane of formula (I).

The silane of formula (I) can be separately employed with the silane of formula (II). For example, they can both be applied neat or from aqueous solution to the substrate simultaneously or in sequence, or they can be premixed and supplied to the treated surface together as a mixture or co-reaction product. The maximum amount of reaction of the silanes is less than that amount of condensation from the hydrolysis products which renders the condensation product insoluble in an aqueous solution which may or may not contain a water soluble solvent such as ethanol.

Illustrative of the diversity of organosilanes covered by formula (I) are the following:

H$_3$CO(CH$_2$CH$_2$O)$_4$OCH$_2$CH$_2$CH$_2$Si(OCH$_2$CH$_2$OCH$_2$CH$_3$)$_3$

H$_3$CO(CH$_2$CH$_2$O)$_{7.5}$OCH$_2$CH$_2$CH$_2$Si(OCH$_3$)$_3$

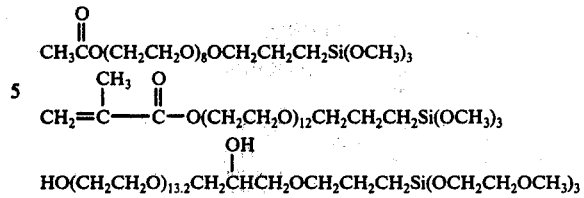

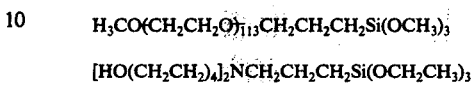

H$_3$CO(CH$_2$CH$_2$O)$_{13.2}$CH$_2$CHCH$_2$OCH$_2$CH$_2$CH$_2$Si(OCH$_2$CH$_2$OCH$_3$)$_3$
  (with OH on CHCH$_2$)

H$_3$CO(CH$_2$CH$_2$O)$_{13}$CH$_2$CH$_2$CH$_2$Si(OCH$_3$)$_3$

[HO(CH$_2$CH$_2$)$_4$]$_2$NCH$_2$CH$_2$CH$_2$Si(OCH$_2$CH$_3$)$_3$

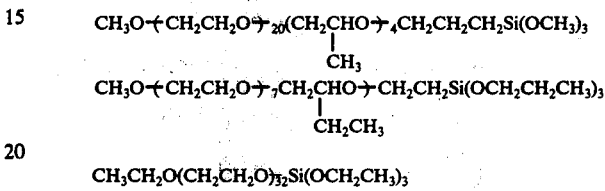

CH$_3$CH$_2$O(CH$_2$CH$_2$O)$_{32}$Si(OCH$_2$CH$_3$)$_3$

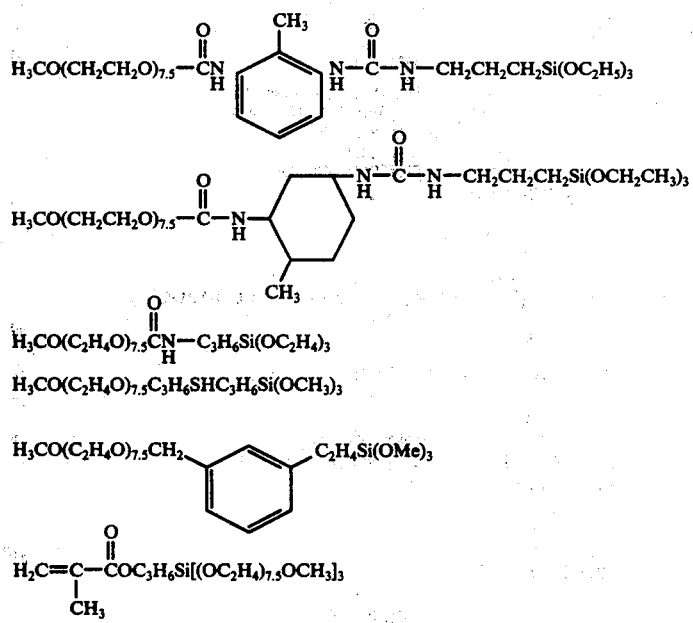

Suitable silanes of formula II useful in the practice of this invention include, by way of example only, the following:

CH$_3$Si(OCH$_3$)$_3$,
CH$_3$CH$_2$CH$_2$CH$_2$Si(OCH$_3$)$_3$,

CH$_3$(CH$_2$)$_4$Si[OCH(CH$_3$)$_2$]$_3$,
CH$_3$(CH$_2$)$_{12}$CHCH$_3$
       |
       Si(OCH$_3$)$_3$

CH$_3$(CH$_2$)$_{17}$Si(OCH$_3$)$_3$
HOOC(CH$_2$)$_6$CHSi(OCH$_3$)$_3$,

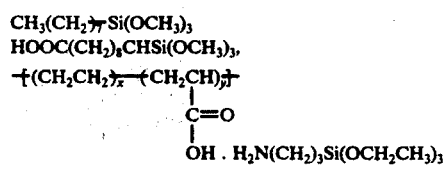

CH$_3$CH$_2$Si(OCH$_3$CH$_3$)$_3$,
CH$_3$CHSi(OCH$_3$)$_3$,
   |
   CH$_3$
CH$_3$(CH$_2$)$_6$Si(OCH$_2$CH$_3$)$_3$,
              Si(OCH$_3$)$_3$
               |
CH$_3$(CH$_2$)$_{11}$CHCH$_2$CHCH$_3$,
               |
              Si(OCH$_3$)$_3$
CH$_3$(CH$_2$)$_{17}$Si(OC$_2$H$_5$)$_3$,

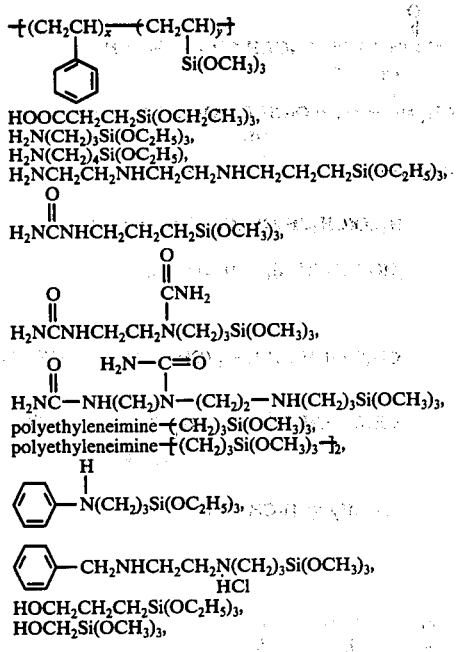

HOOCCH$_2$CH$_2$Si(OCH$_2$CH$_3$)$_3$,
H$_2$N(CH$_2$)$_3$Si(OC$_2$H$_5$)$_3$,
H$_2$N(CH$_2$)$_4$Si(OC$_2$H$_5$)$_3$,
H$_2$NCH$_2$CH$_2$NHCH$_2$CH$_2$NHCH$_2$CH$_2$CH$_2$Si(OC$_2$H$_5$)$_3$, $$\underset{\text{H}_2\text{NCNHCH}_2\text{CH}_2\text{CH}_2\text{Si(OCH}_3)_3,}{\overset{\text{O}}{\|}}$$

$$\underset{\text{H}_2\text{NCNHCH}_2\text{CH}_2\text{N(CH}_2)_3\text{Si(OCH}_3)_3,}{\overset{\text{O}}{\|}\quad\overset{\text{CNH}_2}{\underset{|}{\;}}\overset{\text{O}}{\|}}$$

$$\underset{\text{H}_2\text{NC—NH(CH}_2)\text{N—(CH}_2)_2\text{—NH(CH}_2)_3\text{Si(OCH}_3)_3,}{\overset{\text{O}}{\|}\quad\overset{\text{H}_2\text{N—C=O}}{\underset{|}{\;}}}$$

polyethyleneimine—(CH$_2$)$_3$Si(OCH$_3$)$_3$,
polyethyleneimine—[(CH$_2$)$_3$Si(OCH$_3$)$_3$]$_2$,

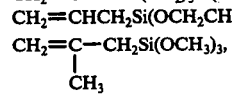

HOCH$_2$CH$_2$Si(OC$_2$H$_5$)$_3$,
HOCH$_2$Si(OCH$_3$)$_3$, polyazamide-[CH$_2$CH$_2$CH$_2$Si(OCH$_3$)$_3$]$_{1-5}$ (see U.S. Pat. No. 3,746,748, patented July 17, 1973, for a complete description of silylated polyazamides),
CH$_2$=C(CH$_3$)COO(CH$_2$)$_3$Si(OCH$_3$)$_3$,
CH$_2$=C(CH$_3$)COO(CH$_2$)$_3$Si(OCH$_2$CH$_2$OCH$_3$)$_3$,
CH$_2$=CHSi(OCH$_3$)$_3$, $$\underset{\text{CH}_2=\text{CHSi(OCCH}_3)_3,}{\overset{\text{O}}{\underset{\|}{\;}}}$$

$$\underset{\text{CH}_2=\text{CHC—NCH}_2\text{CH}_2\text{NH(CH}_2)_3\text{Si(OCH}_3)_3,}{\overset{\text{O}}{\|}}$$

$$\underset{\text{CH}_2=\text{CHCNH(CH}_2)_3\text{Si(OCH}_2\text{CH}_3)_3,}{\overset{\text{O}}{\|}}$$

CH$_2$=CHCH$_2$Si(OCH$_2$CH$_2$OCH$_3$)$_3$,
CH$_2$=C—CH$_2$Si(OCH$_3$)$_3$,
　　　|
　　　CH$_3$
HSCH$_3$Si(OCH$_3$)$_3$,
HS(CH$_2$)$_3$Si(OCH$_3$)$_3$,

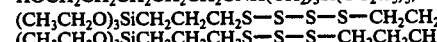

$$\underset{\text{HOCCH=CHC—OCH}_2\text{CH}_2\text{CH}_2\text{Si(OCH}_3)_3,}{\overset{\text{O}}{\|}\quad\overset{\text{O}}{\|}}$$

$$\underset{\text{HSCH}_2\text{CH}_2\text{CH}_2\text{CNH(CH}_2)_3\text{Si(OCH}_2\text{CH}_3)_3,}{\overset{\text{O}}{\|}}$$

$$\underset{\text{HOCH}_2\text{CH}_2\text{CH}_2\text{CH}_2\text{CNH(CH}_2)_3\text{Si(OC}_2\text{H}_5)_3,}{\overset{\text{O}}{\|}}$$

(CH$_3$CH$_2$O)$_3$SiCH$_2$CH$_2$CH$_2$S—S—S—CH$_2$CH$_2$CH$_2$Si(OCH$_2$CH$_3$)$_3$,
(CH$_3$CH$_2$O)$_3$SiCH$_2$CH$_2$CH$_2$S—S—S—CH$_2$CH$_2$CH$_2$Si(OCH$_2$CH$_3$)$_3$,
(CH$_3$CH$_2$O)$_3$Si(CH$_2$)$_3$—S—S—(CH$_2$)$_3$Si(OCH$_2$CH$_3$)$_3$,

$$\underset{\text{CH}_2\text{—CHCH}_2\text{O(CH}_2)_3\text{Si(OCH}_3)_3,}{\overset{\text{O}}{\diagup\diagdown}}$$

-continued

NCCH$_2$CH$_2$Si(OCH$_2$CH$_3$)$_3$,
H$_2$NCH$_2$CH$_2$NH(CH$_2$)$_3$Si(OCH$_3$)$_3$,

H$_2$NCH$_2$Si(OC$_2$H$_5$)$_3$,
H$_2$NCHCH$_2$Si(OC$_2$H$_5$)$_3$,
　　　|
　　　CH$_3$

CH$_2$=CHSi(OCH$_2$CH$_2$OCH$_3$)$_3$,

HSCH$_2$CH$_2$Si(OCH$_2$CH$_3$)$_3$,
HS(CH)$_3$Si(OCH$_2$CH$_3$)$_3$,

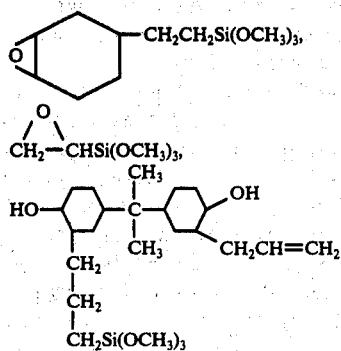

and the like.

Titanium dioxide is an established pigmentary material which can also be employed as a reinforcing filler, albeit an expensive one. It is commonly made by two processes, the chloride process and the sulfate process. The chloride process is a dry process wherein $TiCl_4$ is oxidized to $TiO_2$ particles. In the sulfate process titanium sulfate, in solution, is converted by a metathesis reaction to insoluble and particulate titanium dioxide. In both processes, particle formation can be seeded by aluminum compounds. Thereafter, the processes are essentially the same. The $TiO_2$ particles in a water slurry are put through multiple hydroseparations to separate out the large particles and the further refined pigment in slurry form is passed to a treating tank where the particles may be treated with an aluminum compound and/or silicon compound, such as aluminum triethoxide, sodium aluminate, aluminum trichloride, aluminum sulfate, ethyl silicate, sodium silicate, silicon tetrachloride, trichlorosilane, and the like. By pH adjustment, the pigment is flocculated and precipitated with its coating of alumina and/or silica, or without any coating. It is then made into a filter cake by vacuum drying and further dried in an oven, generally of a vibrating type. The dried pigment is air micronized to break down aggregates of particles. The optimum average particle size can range from about 0.05 to about 0.35 microns with a range of about 0.1 to about 0.25 more preferable.

The aforementioned silanes do not serve a function that is equivalent to the function of a Coupling Agent, it would be improper to characterize them as a member of that class of materials and hence their role in providing strength is not such a factor as to make the size of the particulate titanium oxide significant in the enjoyment of this invention. For that reason, the silanes of formula (I) are hereinafter to be termed a "Dispersion Promoter", that is, a material which makes the titanium oxide more compatible or dispersible within the plastic or resin system in which it is supplied. In one sense the silanes used in this invention serve the function of a surface active agent and in another sense they possess the capacity of enhancing bonding between the titanium oxide and the resin or plastic in which it is provided. Such bonding is effected by virtue of interface compatibility, and/or by way of associative or hydrogen bonding or through covalent bonding to the extent (generally a minimal factor) that the silane possesses organo functional moieties of the classical kind found in Coupling Agents.

One feature of the Dispersion Promoters of this invention is that they alter the surface characteristics of the titanium oxide so that they are more readily and more thoroughly dispersed within the resin or plastic in which they are incorporated and this serves to enhance the appearance of the resulting composite and increase the overall strength of the composite when the particulate material employed is one which serves to reinforce the plastic or resin. This invention is concerned with surface treated particulates where the surface treatment is either the addition of the aforementioned Dispersion Promoters or its hydrolyzate or partial condensate of the hydrolyzate (or the cohydrolyzates or cocondensates thereof) to the surface of the titanium oxide.

The amount of Dispersion Promoter provided upon the titanium oxide particles, as characterized herein, is that amount which alters the surface characteristics of the particles so that they are more readily dispersed within the resin or plastic or other medium in which they are incorporated. Typically, the amount of the Dispersion Promoter [or its hydrolyzate or partial condensate of the hydrolyzate (or the cohydrolyzate or condensates thereof as characterized above in regard to the utilization of the silanes of Formula (II) — hereinafter collectively termed "its derivatives"] which is supplied to the titanium oxide may be as little as 0.25 weight percent to as 90 weight percent, based upon the combined weight with the titanium oxide particles. As a rule, about 0.5 to about 5 weight percent of the Dispersion Promoter and/or its derivatives is adequate for the purposes of appropriately altering the surface characteristic of the particles. However, greater concentrations may be used for purposes which exclude the simple utilization of the so treated titanium oxide particles in plastics or resins. It has been determined that the so treated titanium oxide particles when containing excessive amount of the Dispersion Promoter and its derivatives can be utilized as "dry or semi-dry concentrates". In such as case, the particles are carriers for the Dispersion Promoter. In such embodiment of this invention, the particles containing this excessive amount of Dispersion Promoter (the "concentrates") can be mixed within appropriate proportions with untreated titanium oxide particles and by simple dry blending techniques, the excessive Dispersion Promoter and/or its derivatives is transferred to the untreated particles whereby to effect uniform treatment of the particles with Dispersion Promoter and/or its derivatives. In this sense the concentrate loses its excessive quantity of Dispersion Promoter and/or its derivatives and the total mass of titanium oxide particles is found to be coated with a relatively uniform concentration of Dispersion Promoter and/or its derivatives.

In some cases, the concentrate may be added directly to the plastic, resin, or other vehicle containing untreated titanium oxide particles and by the "integral blending" technique the excess Dispersion Promoter and/or its derivatives is transferred to untreated titanium oxide particles.

The Dispersion Promoter and/or its derivatives may be provided on the titanium oxide particles by any of the known methods by which Coupling Agents are similarly supplied to particulate surfaces. Thus spraying the Dispersion Promoter while tumbling the particles or mixing the particles in a dilute liquid composition containing the Dispersion Promoter and/or its derivative represent adequate treating procedures.

The plastics and/or resin in which the titanium oxide particles treated with the Dispersion Promoter and/or its derivatives include essentially any plastic and/or resin. Included in the definition of plastic are rubber compounds. The treated titanium oxide particles may be supplied to the plastic and/or resin while the same is in any liquid or compoundable form such as a solution, suspension, latex, dispersion, and the like. It makes no difference from the standpoint of this invention whether the plastic contains solvent or nonsolvent, or the solvent is organic or inorganic except, of course, it would not be desirable for any plastic or resin or any of the treated titanium oxide to employ a solvating or dispersing medium which deleteriously affects the components being blended.

Suitable plastics and resins include, by way of example, thermoplastic and thermosetting resins and rubber compounds (including thermoplastic elastomers). The plastics and resins containing the treated particles of this invention may be employed, for example, for molding (including extrusion, injection, calendering, casting, compression, lamination, and/or transfer molding), coating (including laquers, film bonding coatings and painting), inks, dyes, tints, impregnations, adhesives, caulks, sealants, rubber goods, and cellular products. Thus the choice and use of the plastics and resins with the treated particles of this invention is essentially limitless. For simple illustration purposes, the plastics and resins may be alkyl resins, oil modified allkyd resins, unsaturated polyesters as employed in GRP applications, natural oils, (e.g., linseed, tung, soybean), epoxides, nylons, thermoplastic polyester (e.g., polyethyleneterephthalate, polybutyleneterephthalate), polycarbonates, polyethylenes, polybutylenes, polystyrenes, styrene butadiene copolymers, polypropylenes, ethylene propylene co- and terpolymers, silicone resins and rubbers, SBR rubbers, nitrile rubbers, natural rubbers, acrylics (homopolymer and copolymers of acrylic acid, acrylates, methacrylates, acrylamides, their salts, hydrohalides, etc.), phenolic resins, polyoxymethylene (homopolymers and copolymers), polyurethanes, polysulfones, polysulfide rubbers, nitrocelluloses, vinyl butyrates, vinyls (vinyl chloride and/or vinyl acetate containing polymers), ethyl cellulose, the cellulose acetates and butyrates, viscose rayon, shellac, waxes, ethylene copolymers (e.g., ethylene-vinyl acetate copolymers, ethylene-acrylic acid copolymers, ethylene-acrylate copolymers), and the like.

The titanium oxide particles treated with the Dispersion Promoter has in some cases greater affinity for water and as a consequence they are more readily dispersible in water containing systems. The treated particles are more readily incorporated in and stay dispersed longer and more uniformly in water containing systems such as latexes, water solutions, and water dispersions regardless of whether water is the continuous or discontinuous phase. In addition the Dispersion Promoter enhances the dispersibility of the treated inorganic oxides in organic solvents ranging from hydrocarbon liquids to highly polar organic liquids.

It is believed that the treatment of titanium oxide with the Dispersion Promoter during the manufacture of the pigment is most desirable. The treatment can take place in the treatment tank before flocculation, or on the filter cake or in the micronizer. It is believed that treatment prior to the micronizer will serve to minimize aggregation of the particles occurring during the making of the filter cake and/or the drying of it. This provides the advantage of reducing the energy in micronizing, or eliminating it as a step, and/or reducing the loss of fines as occurs during micronizing.

Though this invention has been described in great detail, the following examples are provided to demonstrate specific illustrations of the invention.

SILANE A Preparation of $CH_3O(C_2H_4O)_{7.5}C_3H_6Si(OCH_3)_3$

Into a 1 liter 3 necked flask equipped with electric heating mantle, mechanical stirrer, thermometer, liquid dropping funnel and water cooled condenser is charged 398 gms., 1.0 mole, of $CH_3O(C_2H_4O)_{7.5}CH_2CH=CH_2$, prepared by reaction of CARBOWAX ® Methoxy Polyethylene Glycol 350 (Made by Union Carbide Corporation, New York, N.Y., U.S.A.) with stoichiometric sodium methoxide and allyl chloride in toluene solution, and 30 parts per million (ppm) of platinum added as a 5% solution of $H_2PtCl_6.nH_2O$ (40% Pt) in isopropanol. By means of the dropping funnel, 149.0 gms., 1.1 moles, of $HSiCl_3$ is slowly added over a period of 1 hour beginning at 30° C. Heating is continued from 50° to 60° C for 1 hour to complete reaction and excess unreacted $HiCl_3$ is recovered by distillation to a final pot temperature of 100° C. There results about 533 gms., 1.0 moles, of $CH_3O(C_2H_4O)_{7.5}C_3H_6SiCl_3$ in near quantitative yield, which analyzes 5.5 meg./gm of silyl chloride acidity as measured by titration with a 0.1 N solution of sodium hydroxide. The latter chlorosilane adduct is treated over a period of 2 hours with excess methanol while heating at 70°–80° C and maintaining continuous evacuation of by-product hydrogen chloride by means of a water aspirator. There results 520 gms., 1.0 mole, of $CH_3O(C_2H_4O)_{7.5}C_3H_6Si(OCH_3)_3$ in quantitative yield, containing less than 0.1 meg/gm titratable acidity.

EXAMPLES

Silane A is shown in the following to be effective in water borne coatings:

| Water Reducible Polyester (Water free grind) | | |
|---|---|---|
| | #1 System (parts by weight) | #2 System (parts by weight) |
| Grind Mix (in 1 pint can) | | |
| Cargill 7201-80[1] | 135.8 | 135.8 |
| Ti Pure R-960[2] (titanium dioxide) | 135.0 | 135.0 |
| Silicone Emulsifier* (10% in Butyl Cellosolve ®) | 4.35 | 4.35 |
| Silane A | | 1.35 |
| Conditions: | | |
| High Speed Mixer (Saw tooth disc impeller | 5 minutes | 5 minutes |

Water Reducible Polyester (Water free grind) -continued

|  | #1 System (parts by weight) | #2 System (parts by weight) |
|---|---|---|
| 1¾" dia. at 6000 rpm) | | |

[1]Cargill Inc., Chemical Products Div., Minneapolis, Minn.; an oil free polyester, solid content 80% by wt., in normal butanol., visc. (25° C.) $Z_2$-$Z_4$ (Gardner Scale), Acid No. of solution is 40–48 mg of KOH/gm of sample.
[2]E. I. du Pont de Nemours & Co.; rutile grade containing $Al_2O_3$ and $SiO_2$ surface treatments.
*$(CH_3)_3Si[(CH_3)_2SiO]_{13}[CH_3SiO((OCH_2CH_2)_{17.5}OCH_3)]_{5.5}Si(CH_3)_3$

| Add the following to Grind Mix with mixing | | |
|---|---|---|
| Dimethyl ethanol amine | 10.0 | 10.0 |
| Cymel 303[3] | 27.0 | 27.0 |
| 2-ethyl hexanol | 0.5 | 0.5 |
| n-butanol | 3.5 | 3.5 |
| Troy Latex Anti-crater[4] | 0.65 | 0.65 |
| Deionized Water | 216.7 | 216.7 |

[3]American Cyanamid Company; hexamethoxymethylmelamine.
[4]Troy Chemical Corp., Newark, N. J.; proprietary composition.

Then applied the resulting coating to 24 gage cold rolled steel Bonderite® 1000 panel — 6 mils (wet), 1 mil (dry), air dried for 5 minutes, and baked the panels at 175° C. for 15 min. in a forced circulation oven. The gloss of the baked panel was taken

| Gloss — | 60° | 76 | 94 |
|---|---|---|---|
| (ASTM-523D) | 20° | 30 | 79 |

Hiding power — 6 mils (wet) of #2 is equivalent in hiding to 8 mils (wet) of #1 when drawn down on Morest ™ hiding power charts (form 05) (Morest Company, Freeport, N.Y.)

By increasing the grinding time from 5 minutes to 15 minutes, the following results were obtained:

|  | #1 System | #2 System |
|---|---|---|
| Gloss — 20% (ASTM-523D) | 67 | 79 |

The use of Silane A is effective in providing high gloss in water reducible enamels. It also reduced the grinding time to obtain high gloss and provided improved hiding power or increased pigment efficiency at the same time.

It was observed that conventionally manufactured aged water reducible enamels tended to produce a reduced gloss on application to panels. However, systems containing, e.g., Silane A showed a stable gloss on aging.

Water Reducible Polyester (Water based grind)

| | System (parts by weight) | | |
|---|---|---|---|
| | 1 | 2 | 3 |
| Grind Mix | | | |
| Ti Pure R-900[1] (titanium dioxide) | 177.3 | | 177.3 |
| Treated $TiO_2$* | | 179.1 | |
| Silane A | | | 1.77 |
| Arolon 465[2] (acid terminated polyester) | 60.2 | 60.2 | 60.2 |
| Deionized Water | 109.9 | 109.9 | 109.9 |
| Conditions: | | | |
| Pebble Mill (¼ × ¼ inch ceramic cylinders) | 20hrs. | 20 hrs. | 20 hrs. |

Water Reducible Polyester (Water based grind) -continued

| | System (parts by weight) | | |
|---|---|---|---|
| | 1 | 2 | 3 |
| Then the following was added to the Grind Mix | | | |
| Arolon 465[2] | 166.7 | 166.7 | 166.7 |
| Cymel 301[3] | 40.7 | 40.7 | 40.7 |
| Butyl Cellosolve® | 6.4 | 6.4 | 6.4 |
| Silicone Emulsifier[4] (10% in Butyl Cellosolve®) | 5.0 | 5.0 | 5.0 |
| Deionized Water | 4.3 | 4.3 | 4.3 |
| Dimethyl ethanol amine | 1.0 | 1.0 | 1.0 |
| Apply to 1000 Bonderlite™ 5 mils (wet), air dry 5 minutes and then bake at 175° C. - 20 min. | | | |
| Gloss — 20° (ASTM 523D) | 77 | 84 | 83 |

*R-900 directly treated with a mixture of 0.75 weight % Silane A & 0.25 weight % beta-(3,4-Epoxycyclohexyl)ethyltrimethoxysilane.
[1]E. I. duPont de Nemours & Co., rutile grade containing $A/_2O_3$ surface treatment.
[2]Ashland Chemical Co., Div. of Ashland Oil Inc., Columbus, Ohio, - a water reducible oil free polyester; 70 wt. % solids in $H_2O$ - monobutyl ether of ethylene glycol mixture.
[3]American Cyanamid Company; hexamethoxymethylmelamine.
[4]$(CH_3)_3Si[(CH_3)_2SiO]_{13}[CH_3SiO((OCH_2CH_2)_{17.5}OCH_3)]_{5.5}Si(CH_3)_3$ 5 wet mils of Systems 2 & 3 are equivalent to 6 mils of System 1 in hiding using Morest charts.

Both the integral blend use of Silane A and the direct application of the silane to dry pigment are effective in improving the gloss and hiding of this type of water reducible polyester.

Latex Coatings

Grind Mix in 500 cc. stainless steel beaker.

| | (parts by weight) | | | |
|---|---|---|---|---|
| | 1 | 2 | 3 | 4 |
| Distilled Water | 200 | 200 | 200 | 200 |
| Potassium tripolyphosphate | 8 | 8 | 8 | |
| Igepal CA-630[1] (nonionic surfactant) | 8 | 8 | 8 | 8 |
| Ethylene glycol | 80 | 80 | 80 | 80 |
| Merbac 35[2] | 6 | 6 | 6 | 6 |
| Foamaster W-14[3] | 6 | 6 | 6 | 6 |
| Ti Pure R-900 | 840 | | 840 | 840 |
| Treated $TiO_2$* (see above) | | 848 | | |
| Silane A | | | 8.4 | 8.4 |
| Ammonium Hydroxide (28%) | | | 8 | |
| Citric Acid | | | | 10 |
| High Speed Mixer (same as above) Grind 15 min. and then added distilled water. | 132 | 132 | 132 | 132 |
| Mix Slowly | | | | |
| Above Grind Base | 320 | 320 | 320 | 320 |
| Ucar 4358[4] | 660 | 660 | 660 | 660 |
| Butyl Carbitol® | 16 | 16 | 16 | 16 |
| Dibutyl phthalate | 9 | 9 | 9 | 9 |
| Ammonium Hydroxide (28%) | 2 | 2 | | 2 |
| Foamaster W-14 (see above) | 1.5 | 1.5 | 1.5 | 1.5 |
| Acrysol G-110 (11%)[5] | 22 | 22 | 22 | 22 |
| Adjust to pH 8.6–8.7 Draw down 5 mils (wet) on glass Air Dry | | | | |
| Gloss — 20° (ASTM 523D) | 28 | 29 | 34 | 46 |
| 50° | 67 | 67 | 72 | 76 |

[1]GAF Corp. N.Y., N.Y.; octylphenoxypoly(oxyethylene) ethanol. 9 moles ethylene oxide/mole of octyl phenol.
[2]Merck and Co., Rahway, N.J.; benzylbromoacetate.
[3]Diamond Shamrock Chemical Co., Morristown, N.J.; proprietary chemical, antifoam agent. [4]Union Carbide Corporation Acrylic polymer, 45% solids, 0.15 micron particle size (ave.), Tg 25° C.
[5]Rohm & Haas Co., Phila, Pa. - ammonium polyacrylate solution, thickener, 22% solids in $H_2O$, pH — ≈9.

3 system and #4 system grinds were adjusted to be on the alkaline and acid side respectively to aid hydrolysis of the silane. All final mixes were adjusted to a pH of 8.6 - 8.7 with ammonia.

Hiding power chart tests showed 5 mils (wet) draw = downs of systems #2, #3, & #4 to be equivalent to 6 mils (wet) of #1 without silane A, showing improvements in gloss and hiding in the latex systems containing Silane A.

Solvent Based Coatings

Silane A was found to offer gloss and hiding power advantages in solvent base systems. The following systems were prepared by pebble mill.

|  | (parts by weight) | | |
| --- | --- | --- | --- |
|  | 1 | 2 | 3 |
| Grind Portion (16 ahours) | | | |
| Toluene | 100 | 100 | 100 |
| R-900 | 100 | 100 | 100 |
| Lexinol AC-1 (lecithin) | 1.0 | 1.0 | — |
| Silane A | — | 1.0 | 1.0 |
| Letdown Portion (1 hour) | | | |
| VMCC[1] Solution* | 320 | 320 | 320 |
| 7 mil (wet) film on Bonderite ®1000 24 hr. air dry gloss (ASTM 523D) - 60 | 31 | 82 | 67 |

*VMCC[1] - 100 pbw, diisodecylphthalate - 20 pbw, methyl isobutyl ketone - 150 pbw, toluene - 50 pbw.
[1]Union Carbide Corporation; Terpolymer of 83 wt. % vinyl chloride, 16 wt. % vinyl acetate and 1 wt. % interpolymerized acid.

Hiding power charts showed that 6 mils of system −2 were equivalent to 7 mils of system −1, therefore Silane A added improvement in gloss and hiding power in solvent paint systems.

Titanium Dioxide Slurry Treatment

Simulated process treatment of $TiO_2$ slurries with Silane A resulted in dry product which provided improved gloss and hiding power when evaluated in water reducible polyester enamels.

R-900 and $TiO_2$ containing 0.3% alumina were evaluated by Silane A treatment in slurry to simulate plant procedures in making $TiO_2$ pigment where the pigment is treated in a slurry, after hydroseparation of large particles, by coating in the slurry, flocculating the pigment, making a filter cake which is dried and micronized.

The stepwise Silane A procedure used to slurry treat the titanium dioxide was as follows:

```
To 283 grams of distilled water
add 6 mls 25% (wt) sulfuric acid
add 200 grams of TiO2 with agitation to pH 3.2
add required amount of Silane A. Mix for 30 min.
Adjust pH to 5.5 with potassium hydroxide solution
Filter on vacuum filter
Wash cake with water to remove salts
Oven dry at 105° C for 1-2 hrs.
Sift dry product thru a 60 mesh screen and
evaluate in the following system:
```

Water Reducible Polyester (Water based grind)

| Grind | System (parts by weight) | | | |
| --- | --- | --- | --- | --- |
|  | 1 | 2 | 3 | 4 |
| Ti Pure R-900 ($TiO_2$) as received | 177.3 | | | |
| Slurry Treated $TiO_2$ - no silane | | 177.3 | | |
| Slurry Treated $TiO_2$ - 1% Silane A | | | 179.1 | |
| Slurry Treated $TiO_2$ - 3% Silane A | | | | 182.8 |
| Arolon 465 | 60.2 | 60.2 | 60.2 | 60.2 |
| Deionized Water | 109.9 | 109.9 | 109.9 | 109.9 |
| Pebble Mill | 4 hrs | 4 hrs | 4 hrs | 4 hrs |
| Hegman ® Grind (ASTM D-1210) | 7+ | 7+ | 7+ | 7+ |
| Add the following | | | | |
| Arolon 465 | 166.7 | 166.7 | 166.7 | 166.7 |
| Cymel 301 | 40.7 | 40.7 | 40.7 | 40.7 |
| Butyl Cellosolve | 6.4 | 6.4 | 6.4 | 6.4 |
| Silicone Emulsifier (10% in Butyl Cellosolve) ®* | 5.0 | 5.0 | 5.0 | 5.0 |
| Deionized Water | 4.3 | 4.3 | 4.3 | 4.3 |
| Dimethyl ethanol amine | 1.0 | 1.0 | 1.0 | 1.0 |
| Apply to 1000 Bonderite 5 mils (wet) then baked at 175° C for 20 min. | | | | |
| Gloss (ASTM 523D) — 20° | 75 | 77 | 75 | 80 |

*see above

Morest hiding power charts show that 5 mils of #4 are equivalent to 6 mils of #1, 2 & 3. Therefore #4 made with 3% silane slurry treated $TiO_2$ provides coatings with higher gloss and hiding power. The lack of positive results with #3 indicates that the slurry procedure has to be optimized to quantitatively deposit the silane on the pigment since 1% was effective in previous work where the silane was added directly to the pigment or "in-situ" as a paint additive.

99.7% $TiO_2$ (0.3% alumina) was treated similarly except that the control was used as received and mix #2 was made with 1% direct treatment for comparison with slurry treated titanium dioxide. The following results were obtained:

Water Reducible Polyester (Water based grind)

| Grind | System (parts by weight) | | | |
| --- | --- | --- | --- | --- |
|  | 1 | 2 | 3 | 4 |
| 99.7% $TiO_2$ (0.3% alumina) | 177.3 | | | |
| Direct Treated $TiO_2$-1% Silane A | | 179.1 | | |
| Slurry Treated $TiO_2$-1% Silane A | | | 179.1 | |
| Slurry Treated $TiO_2$-3% Silane A | | | | 182.8 |
| Arolon 465 | 60.2 | 60.2 | 60.2 | 60.2 |
| Deionized Water | 109.9 | 109.9 | 109.9 | 109.9 |
| Pebble Mill | 4 hrs | 4 hrs | 4 hrs | 4 hrs |
| Hegman ® Grind | 7 | 7+ | 7+ | 7+ |
| Add the following | | | | |
| Arolon 465 | 166.7 | 166.7 | 166.7 | 166.7 |
| Cymel 301 | 40.7 | 40.7 | 40.7 | 40.7 |
| Butyl Cellosolve | 6.4 | 6.4 | 6.4 | 6.4 |
| Silicone Emulsifier (10% in Butyl Cellosolve)* | 5.0 | 5.0 | 5.0 | 5.0 |
| Deionized Water | 4.3 | 4.3 | 4.3 | 4.3 |
| Dimethyl ethanol amine | 1.0 | 1.0 | 1.0 | 1.0 |
| Apply to 1000 Bonderite 5 mils (wet) Bake at 350° F - 20 min. | | | | |
| Gloss — 20° | 50 | 81 | 71 | 73 |

Hiding power — 5 mils of #4 (3% silane) was equivalent to 6 mils of #1, 2 & 3.

The above was repeated by grinding for 12 hrs. to improve dispersion which gave the following results:

| Gloss 20° | 61 | 82 | 78 | 80 |
| --- | --- | --- | --- | --- |

Viscosity of the finished paints were also measured to determine the effect of the silane treatment.

|  | #1 | #2 | #30 | #4 |
| --- | --- | --- | --- | --- |
| Viscosity - Brookfield | | | | |
| 6 RPM (cps) | 3240 | 2100 | 1740 | 1500 |
| 60 RPM (cps) | 1152 | 750 | 736 | 650 |
| 6/60 viscosity ratio | 2.8 | 2.8 | 2.4 | 2.3 |

As can be seen, the silane treatments effectively reduce the paint viscosity and/or thixotropy (viscosity ratio). This provides the advantage of being able to increase the sprayable solids as well as improve the gloss. * See above.

What is claimed is:

1. A composition comprising titanium dioxide particles containing on their surfaces a silane, its hydrolyzates or resulting condensate, which silane possesses at least two to about three hydrolyzable groups bonded to the silicon thereof and an organic group which contains a polyalkylene oxide group, said silane being present on said surfaces in an amount sufficient to improve the dispersibility of said particles in a resin or plastic medium.

2. The composition of claim 1 wherein the amount of silane is from about 0.25 to about 5 weight percent of the composition.

3. The composition of claim 2 wherein the amount of the silane is from about 0.5 to about 0.3 weight percent of the composition.

4. The compositions of claim 1 wherein the silane has the following general formula:

$$R^{II}(OR^I)_a ORSiX_3$$

wherein R can be any divalent organic group which is either oxygen or carbon bonded to the silicon atom, $R^I$ is one or more 1,2-alkylene groups each containing at least 2 carbon atoms and not more than about 4 carbon atoms; $R^{II}$ is hydrogen, alkyl, acyloxy or an organofunctional group; X is a hydrolyzable group; and a is a number having an average value of from 4 to about 150.

5. The composition of claim 4 wherein the silane is coreacted or comixed with a different silane, as encompassed by the following formula:

$$R_n^3(SiX_{4-n})_b$$

or the cohydrolyzate or the cocondensate of such different silane with the silane, wherein $R^3$ is an organic radical whose free valence is equal to the value of $b$, X is as defined above, $n$ is equal to 0 or 1 and $b$ is a positive number.

6. The composition of claim 4 wherein the silane has the following formula:

$$H_3CO(CH_2CH_2O)_{7.5}OCH_2CH_2CH_2Si(OCH_3)_3.$$

7. The composition of claim 4 wherein the silane has the following formula:

$$H_3CO(CH_2CH_2O)_{\overline{113}}-CH_2CH_2CH_2Si(OCH_3)_3.$$

8. The process of treating titanium dioxide with the silane described in claim 5 which comprises flocculating the titanium dioxide in the presence of said silane during the manufacture of titanium dioxide after it has undergone hydroseparation.

9. The composition of claim 4 wherein $a$ has an average value of from 4 to 120.

10. The composition of claim 5 wherein $a$ has an average value of from 4 to 120.

* * * * *

UNITED STATES PATENT OFFICE
CERTIFICATE OF CORRECTION

Patent No. 4061503           Dated December 6, 1977

Inventor(s) Sidney Ethan Berger et al.

It is certified that error appears in the above-identified patent and that said Letters Patent are hereby corrected as shown below:

Column 2, line 67, "a≡$SiX_3$" should read --a -$SiX_3$--.
Column 3, line 15, "$R^{II}$" should read --$R^I$--. Column 6, line 12, the formula "[HO($CH_2CH_2$)$_4$]$_2$N$CH_2CH_2CH_2$Si(O$CH_2CH_3$)$_3$" should read --[HO($CH_2CH_2$O)$_4$]$_2$N$CH_2CH_2CH_2CH_2$Si(O$CH_2CH_3$)$_3$--.
Column 12, line 37, "$HiCl_3$" should read --$HSiCl_3$--. Column 14, line 67, the symbol "=" should be deleted.

Signed and Sealed this

Second Day of May 1978

[SEAL]

Attest:

RUTH C. MASON
Attesting Officer

LUTRELLE F. PARKER
Acting Commissioner of Patents and Trademarks